US008000529B2

(12) United States Patent
Chao et al.

(10) Patent No.: US 8,000,529 B2
(45) Date of Patent: Aug. 16, 2011

(54) SYSTEM AND METHOD FOR CREATING AN EDITABLE TEMPLATE FROM A DOCUMENT IMAGE

(75) Inventors: Hui Chao, Palo Alto, CA (US); Jian Fan, Palo Alto, CA (US); Steven J. Simske, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 11/827,526

(22) Filed: Jul. 11, 2007

(65) Prior Publication Data

US 2009/0016605 A1    Jan. 15, 2009

(51) Int. Cl.
*G06K 9/34* (2006.01)
*G06K 9/62* (2006.01)
*G06K 9/00* (2006.01)

(52) U.S. Cl. ........................................ 382/176; 382/209

(58) Field of Classification Search .................. 382/162, 382/164, 167, 173, 174, 176, 179, 180, 190, 382/199, 203, 209, 218, 224, 281, 290, 305, 382/306, 319; 715/203, 204, 230, 235, 255, 715/517, 530, 720, 721, 723, 725, 730; 345/427, 345/475, 619, 620, 629, 660, 671, 716; 375/240.11, 375/240.21
See application file for complete search history.

(56) References Cited

U.S. PATENT DOCUMENTS

| | | | | |
|---|---|---|---|---|
| 5,692,117 | A * | 11/1997 | Berend et al. | 345/475 |
| 5,742,295 | A * | 4/1998 | Lindholm | 345/427 |
| 6,151,426 | A | 11/2000 | Lee et al. | |
| 6,202,073 | B1 * | 3/2001 | Takahashi | 715/204 |
| 6,769,094 | B2 * | 7/2004 | Loesch et al. | 715/203 |
| 6,826,727 | B1 * | 11/2004 | Mohr et al. | 715/235 |
| 6,904,170 | B2 | 6/2005 | Chao et al. | |
| 6,952,803 | B1 * | 10/2005 | Bloomberg et al. | 715/236 |
| 7,216,295 | B2 * | 5/2007 | Wu et al. | 715/203 |
| 7,340,673 | B2 * | 3/2008 | Malone | 715/255 |
| 7,418,656 | B1 * | 8/2008 | Petersen | 715/230 |
| 7,432,940 | B2 * | 10/2008 | Brook et al. | 345/629 |
| 7,480,864 | B2 * | 1/2009 | Brook et al. | 715/720 |
| 2003/0133612 | A1 | 7/2003 | Fan | |
| 2005/0076295 | A1 | 4/2005 | Simske et al. | |
| 2009/0016605 | A1 * | 1/2009 | Chao et al. | 382/176 |

* cited by examiner

*Primary Examiner* — Amir Alavi

(57) ABSTRACT

Embodiments of the present invention recite a system and method for creating an editable template from a document image. In one embodiment of the present invention, the spatial characteristics and the color characteristics of at least one region of a document are identified. A set of characteristics of a graphic representation within the region are then determined without the necessity of recognizing a character comprising the graphic representation. An editable template is then created comprising a second region having the same spatial characteristics and the same color characteristics of the at least one region of the document and comprising a second graphic representation which is defined by the set of characteristics of the first graphic representation.

20 Claims, 13 Drawing Sheets

SYSTEM AND METHOD FOR CREATING AN EDITABLE TEMPLATE FROM A DOCUMENT IMAGE

FIELD OF THE INVENTION

Embodiments of the present invention are related to the field of document processing.

BACKGROUND OF THE INVENTION

Optical Character Recognition (OCR) technology is widely used today to create a document image which recognizes characters in order to capture the content of the original document. However, OCR is typically still not entirely successful in capturing the content of a document. While OCR is usable in capturing the content of a document, other characteristics of the document may not be recognized, or re-created, using OCR.

As an example, OCR is not well suited for capturing the aesthetic qualities of a document comprising text and images. More specifically, the spatial relationships between various zones comprising a document, the colors used in the document, and other style elements which a user may wish to re-create in another document without necessarily re-using the content of the original document.

SUMMARY OF THE INVENTION

Embodiments of the present invention recite a system and method for creating an editable template from a document image. In one embodiment of the present invention, the spatial characteristics and the color characteristics of at least one region of a document are identified. A set of characteristics of a graphic representation within the region are then determined without the necessity of recognizing a character comprising the graphic representation. An editable template is then created comprising a second region having the same spatial characteristics and the same color characteristics of the at least one region of the document and comprising a second graphic representation which is defined by the set of characteristics of the first graphic representation.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "determining," "creating," "differentiating," "assigning," "comparing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
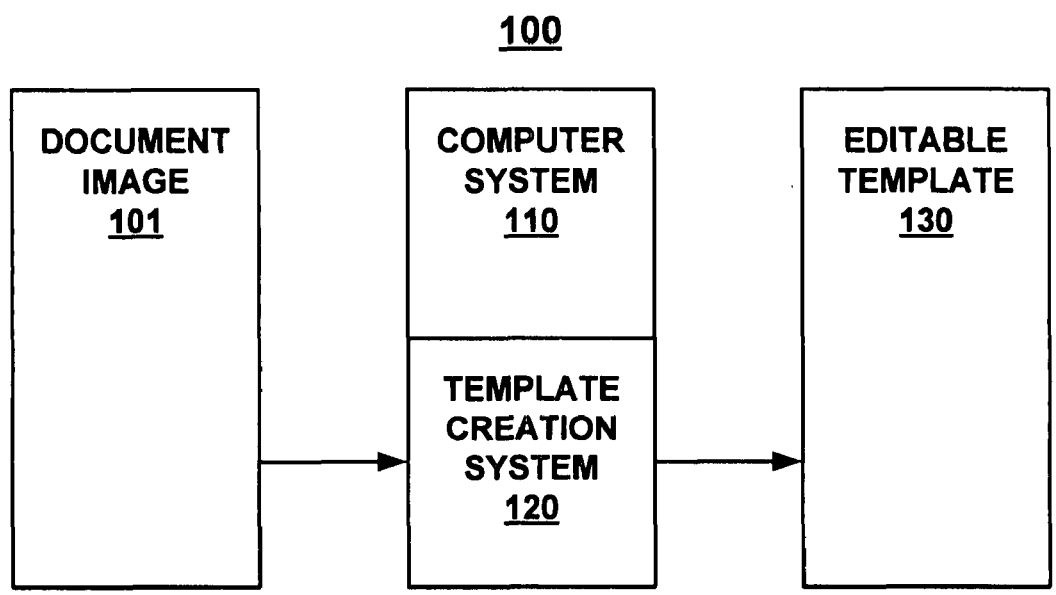
FIG. 1 is a block diagram of a system for creating an editable template from a document in accordance with embodiments of the present invention.

FIG. 1 is a block diagram of a system 100 for creating an editable template from a document in accordance with embodiments of the present invention. In FIG. 1, a template creation system 120 is operable on a computer system 110. A document image 101 of a document is used as an input by template creation system 120 to create an editable template 130 which captures the overall layout of document image 101. In embodiments of the present invention, document image 101 may be a scanned image from a scanner (not shown) which is communicatively coupled with computer system 110, a video frame, or may be a data file accessed by computer system 110.

In embodiments of the present invention, the document image 101 is a scanned image of a document in a media file type such as Tag(ged) Image File Format (.TIF), Bit Map (.BMP), Graphic Interchange Format (.GIF), Portable Document Format (.PDF), Joint Photographic Experts Group (.JPEG), etc. or an electronic document in a word processing format such as WORD (.DOC), Hypertext Markup Language (HTML), or another suitable document type. Template creation system 101 is operable to automatically analyze document image 101 and detect regions in which the document layout elements are present. The document layout elements may include text, graphics, photographs, drawings, and other visible components of document image 101. Alternatively, template creation system 120 permits the user to manually specify, using a graphic user interface, the various regions occupied by these layout elements. Template creation system 120 is operable to output a specification of the image document layout definition in a specified format such as extensible Markup Language (XML). In embodiments of the present invention, template creation system 120 outputs editable template 130 to, for example, a storage device such as a template database. In embodiments of the present invention, editable template 130 comprises a definition of the region type, modality and other properties, visible area, and other specifications of the document image (e.g., 101). Using predefined image document templates, new image documents can be quickly put together with new text, photograph, and graphic layout elements while still retaining the overall look and aesthetic qualities of document image (e.g., 101). Furthermore, predefined templates such as editable template 130 may be used to conform image documents to correct inadvertent shifts during document scanning, for example, so that they follow a predefined format.

In embodiments of the present invention, an image layout definition can also serve as input to other systems and applications. For example, an image layout definition may be used for document comparison and clustering/classification purposes. Further, an image layout definition may be used as a template for processing information. For example, and image layout definition may define a template with six photographic regions arranged in a certain layout. This template may be used to arrange and layout photographs in a folder, for example. An image layout definition may be easily compared with other templates or layout definition files to find the most suitable arrangement or layout of the photographs. The use of an image layout definition as a template (e.g., 130) also enables scanned document images that may have been slightly skewed or shifted to be corrected according to the layout specification in the template. In addition, an image layout definition may be used as input to a print-on-demand (POD) system that uses it to proof the layout of the documents as a measure for quality assurance. An image layout definition may also be used to ensure proper rendering of a complex scanned document.

Figure 2:
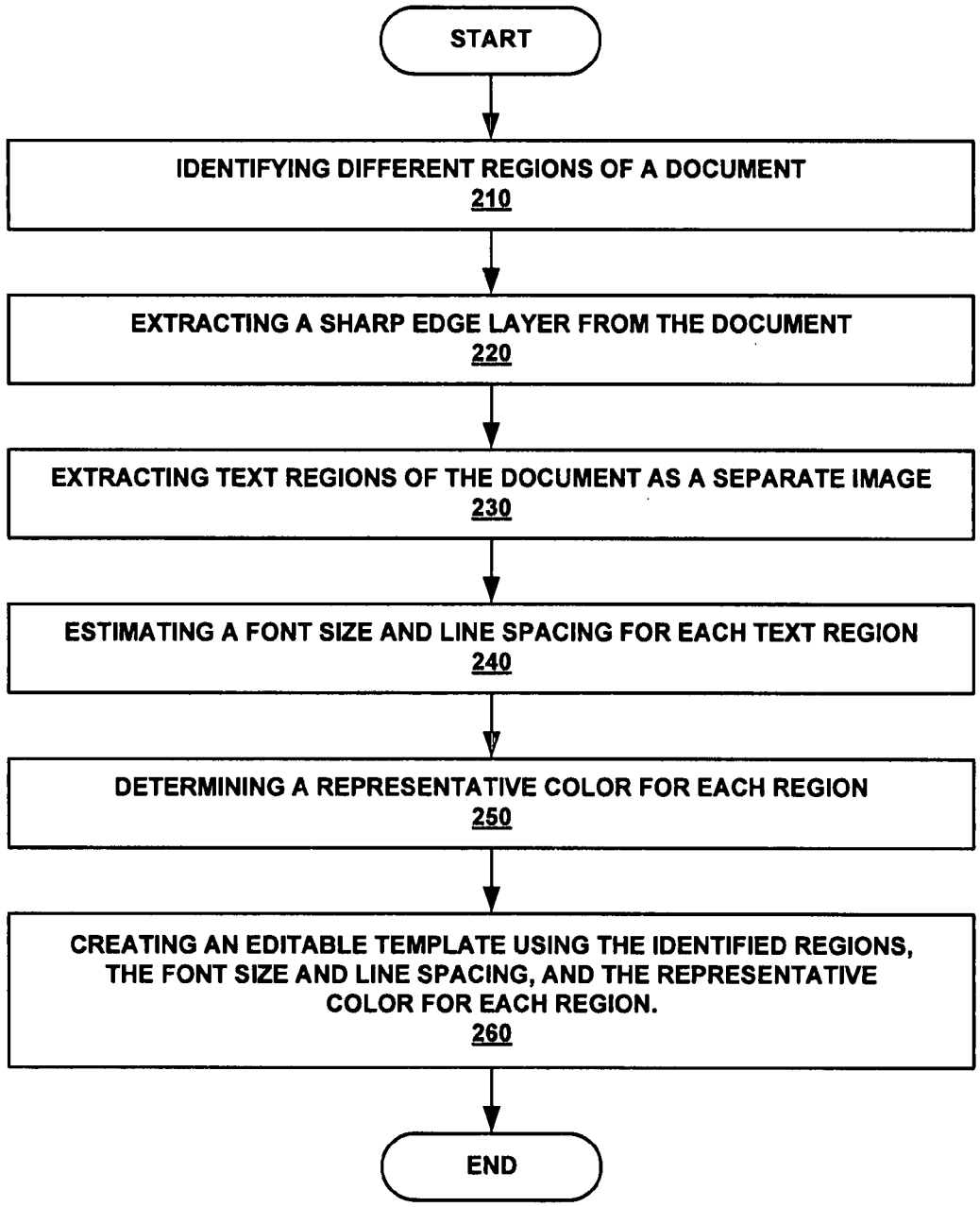
FIG. 2 is a flowchart of a method for creating an editable template from a document in accordance with an embodiment of the present invention.

FIG. 2 is a flowchart of a method 200 for creating an editable template from a document in accordance with an embodiment of the present invention. In block 210 of FIG. 2, different regions of a document are identified. In embodiments of the present invention, a source of document image 101, such as a stored file, a video frame, the output from a scanner, is opened and displayed on computer system 110. Optionally, the user may specify to resize the image file and/or to display the image file so that the entire image is shown in the available display screen of computer system 110. In embodiments of the present invention, the user may instruct computer system 110 to generate region definitions by inputting the region boundaries or vertices, by a region click-and-select process, or by an automatic region analysis process.

Figure 3A:
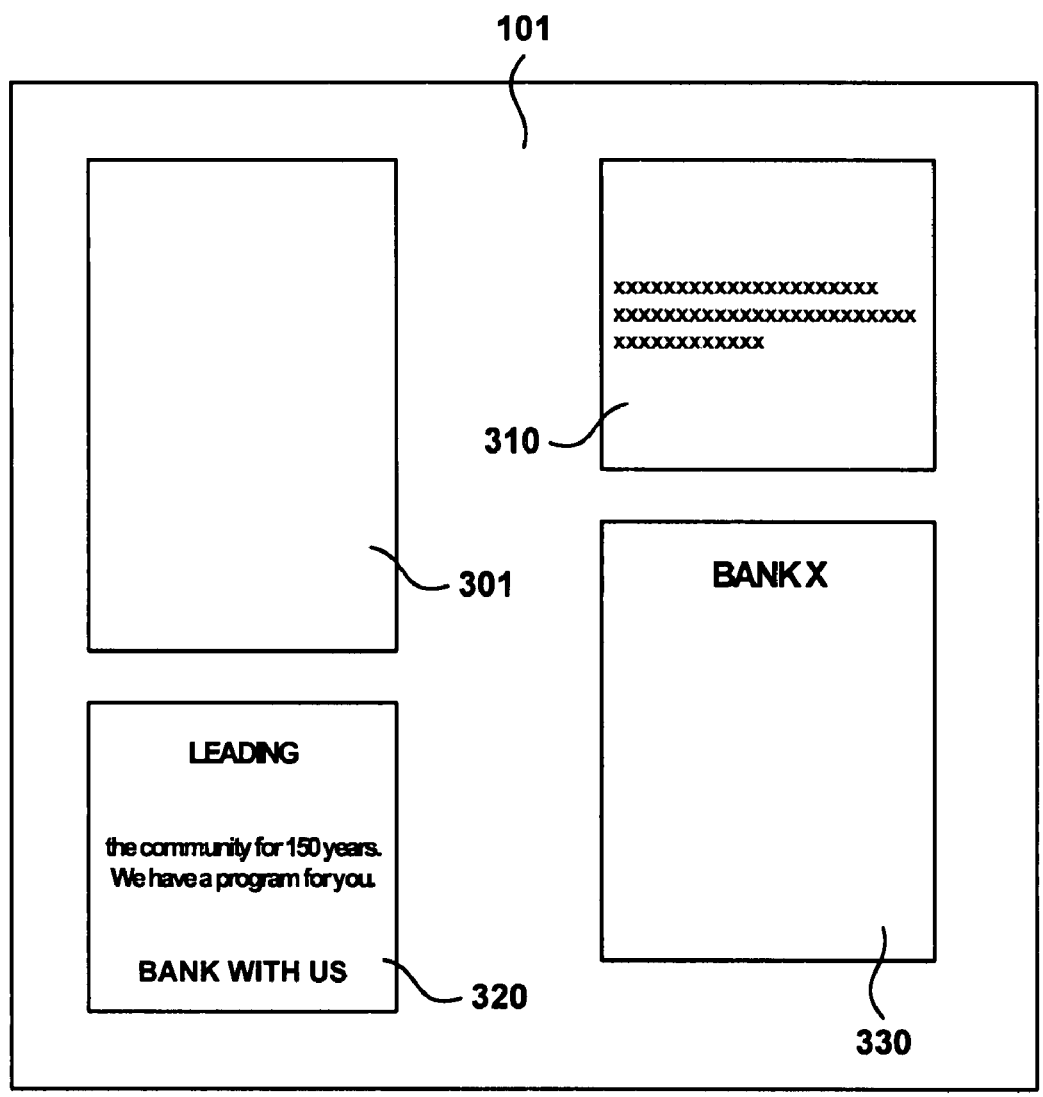
FIGS. 3A-3F show regions of a document image processed in accordance with an embodiment of the present invention.

With reference to FIG. 3A, a document image 101 is shown. In the example of FIG. 3A, document image 101 comprises four regions (e.g., 301, 310, 320, and 330). For the purposes of the following discussion, it is assumed that region 301 comprises a photographic image while region 330 comprises an image having an overlying portion of text. Furthermore, region 310 comprises a text region and region 320 comprises a text region having a plurality of font sizes within.

In one embodiment, a region click-and-select process enables a user to use a pointing device to indicate the location of points within regions of interest for classification and segmentation. For example, if the user clicks on a point 302 of document image 101 displayed on the graphical user interface of computer system 110, the region (e.g., 301) containing the identified point 302 is analyzed and the boundaries of the region (e.g., 301) are derived. The data type (e.g., an image) of the region containing the identified point is also determined. Therefore, the user may define the regions of document image 101 by successively clicking on a point within each region.

Automatic region analysis is a process that performs zoning analysis on document image 101 to form all of its regions using a segmentation process, and determine the region characteristics using a classification process. Various techniques are well-known in the art for performing segmentation analysis, which fall into three broad categories: top-down strategy (model-driven), bottom-up strategy (data-driven), and a hybrid of these two strategies. Various techniques are also well-known in the art for performing classification analysis. Alternatively, a user can manually define a polygonal region, a rectangular region, and a visible area in document image 101. This process is described in greater detail below.

In embodiments of the present invention, the defined regions in document image 101 are then displayed on computer system 110. In one embodiment, the boundaries of each region are outlined by color-coded lines. For example, a text region may be outlined in green, a color graphic region may be outlined in purple, a black and white graphic region may be outlined in blue, a photographic region may be outlined in yellow, etc. Furthermore, a user may provide or modify the layout definition of selected regions in the document in one embodiment. For example, the user may select a region containing a photographic element and change the current region type setting "photo" to another region type. The user may also verify or modify the layout specification by inputting the region modality (such as black and white, gray scale or color), highlighting a specific region, and deleting a region using the same pop-up submenu. By specifying the modality of a region, the bit-depth of the region is effectively changed. For example, a black-and-white setting may equate to an 1-bit bit-depth, a gray scale setting may equate to an 8-bit bit-depth, and a color setting may equate to a 24-bit bit-depth. Therefore, by giving the user the ability to change the modality and type of each region, the same image document can be modified to be used for another purpose, which is commonly known as re-purposing.

In one embodiment, if desired, the user may also update the boundaries of the defined regions by selecting the region and then drag the outline of the region boundaries to enlarge or contract the region by a process such as "rubberband boxing." The user may also modify or specify the margins of document image 101 by selecting menu items associated with the visible area function. In one embodiment, the visible area of document image 101 defaults to the entire image, but the user may make the visible area smaller than the entire document image. In one embodiment, if the visible area specified by the user is too small to fully enclose any one region in document image 101, it is automatically expanded to include the full boundaries of all the regions in document image 101. A click-and-drag method can also be used to modify the visible area of the document image 101.

As described above, one embodiment permits user definition of polygonal regions, rectangular regions, and visible areas in document image 101. Generally, polygonal regions are regions with non-rectangular boundaries or regions with more complex boundaries. To create a polygonal region, the user may select a create polygon function, and then the user may indicate the vertices of the polygon around the document layout element by successive clicks of the pointing device or mouse on document image 101. The displayed document image 101 shown on computer system 110 is updated continually on the screen to provide a visual feedback of the resulting lines and vertices of the polygonal region. In one embodiment, template creation system 120 may automatically close the polygonal region, in other words connect the first user-indicated vertex and the last user-indicated vertex. The user may indicate the completion of the vertices by selecting an appropriate function or by double-clicking when inputting the last vertex. The polygonal region is thus entered by the user.

In one embodiment, the boundaries of the generated region are verified to ensure that the enclosed region does not overlap another region in document image 101 and that the boundary lines of the region do not cross each other, for example. A separate and independent region manager may be selected to enforce the adherence to a region enforcement model in one embodiment. For example, one region enforcement model may specify that no regions may have overlapping boundaries, another region enforcement model may specify that a text region may be overlaid over a background region and that the text is contained completely within the background region, or another region enforcement model may specify a permissible ordering of overlapping regions and what type of layout elements those overlapping regions may contain (commonly termed "multiple z-ordering"), etc.

In one embodiment, the region type and modality and/or other definitions associated with the polygonal region are set to the default values. The default values may be determined a priori by the user or they may be system-wide defaults. A newly-created polygonal region may default to text and black-and-white type and modality values, respectively. These default values can be easily modified by the user to other values, such as described. A specification of the polygon region definition is generated in one embodiment. However, the generation of the polygonal region definition in a particular format, such as extensible Markup Language, may be performed when the entire document layout has been completed. The polygonal region can be saved along with the other document layout definitions of the document.

Additionally, a user can define a rectangular region in one embodiment. A rectangular region is, by definition, a four-sided area with 90 degree corners. The user may first select a create a rectangular region function, and then indicate, using the pointing device on the graphical user interface, the first corner of the rectangle. A rubberband box is displayed on the graphical user interface which enables the user to drag or move the opposing corner of the rectangular region. In one embodiment, the boundaries of the generated rectangular region are verified by using a region manager to ensure that the resultant regions comply with a region enforcement model. For example in one embodiment, the region may not be permitted to overlap another region in the document and that the boundary lines of the region should not cross each other. Other examples of region enforcement models in accordance with an embodiment of the present invention comprise a specification that no regions may have overlapping boundaries, a specification that a text region may be overlaid over a background region and that the text is contained completely within the background region, or a specification of permissible ordering of overlapping regions and what type of layout elements those overlapping regions may contain (commonly termed "multiple z-ordering"), etc. In one embodiment, the default characteristics of the newly-created rectangular region may be set to the default values of text and black-and-white type and modality values respectively.

As described above, the visible area definition specifies the outer boundaries around the edge of the document. In one embodiment, the user invokes the visible area functionality by selecting the create visible area function and indicates the first corner of the visible area. A rubberband box is then displayed in the graphical user interface to enable the user to manipulate the size (width and length) of the visible area. In one embodiment, the user then indicates the location of the opposite corner of the visible area using the pointing device. The resulting visible area boundaries are displayed and verified. In one embodiment, if the visible area boundaries are too small to fully enclose any one region in the document, its boundaries are automatically expanded to enclose the boundaries of all the regions in the document. The visible area definitions are generated and saved along with other document layout element layout definitions, for later use in creating editable template 130. The visible area layout specification is particularly important in electronic publication applications as it enables the user to specify the margins on the image, and thus the amount of white space around the boundaries of the page.

Figure 3B:
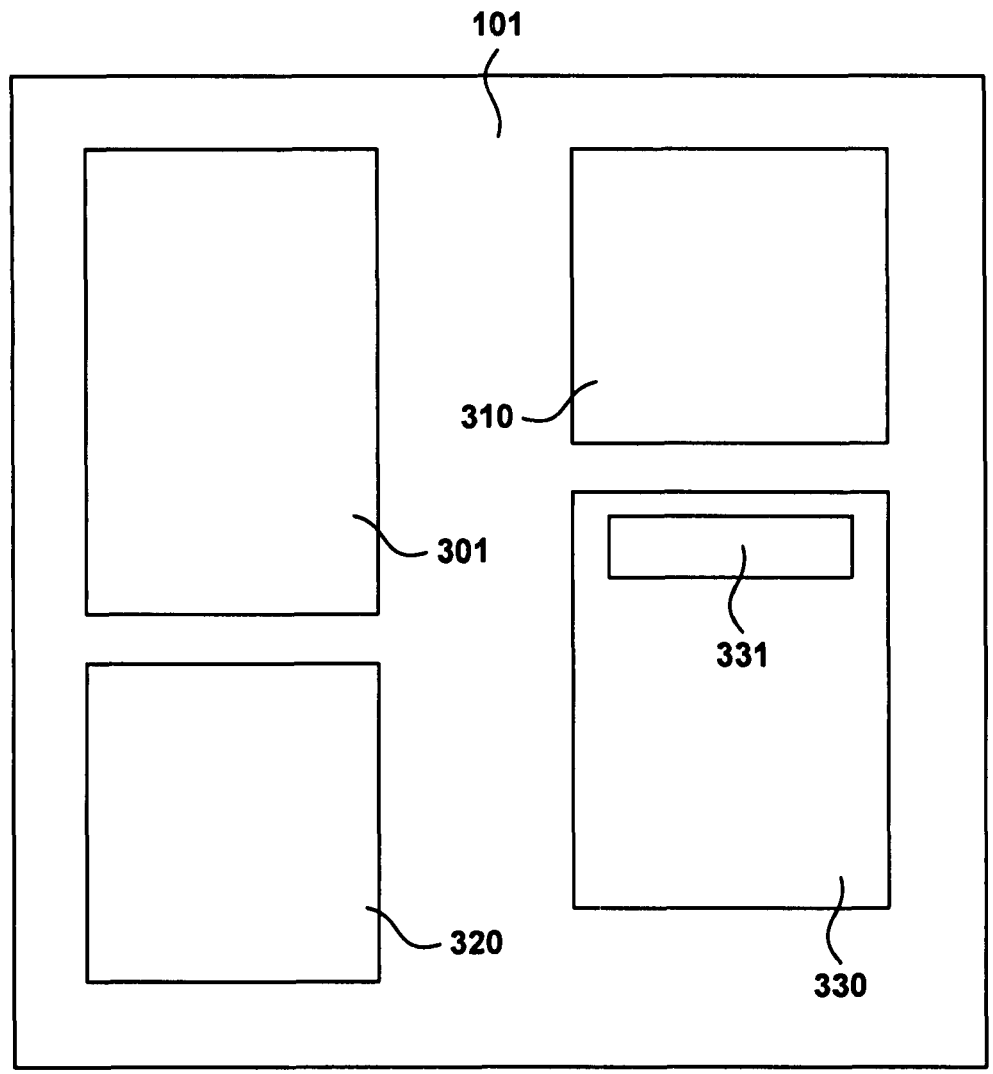

As shown in FIG. 3B, following the identification of regions as described above, the identified regions of document image 101 are shown. In other words, the boundaries (e.g., size and relationship with reference to document image 101) of regions 301, 310, 320, and 330 are extracted and stored. As shown in FIG. 3B, region 320 is not yet divided into sub-regions based upon the different font sizes of text within that region. However, a text region 331 has been identified as a text region which overlies, or is contained within, image region 330.

In block 220 of FIG. 2, a sharp-edge layer is extracted from the document. In one embodiment, text-like pixels from an image, such as a digital image or bitmap image, are identified by classifying line segments of pixels within an image by edge-bounded averaging. It is noted that pixels of other graphic characters such as numbers, line drawings, symbols, or the like can also be detected. This includes dark text on light backgrounds, light text on dark backgrounds, and/or text on pictorial regions.

In one embodiment, color space conversion of document image 101 is performed. Assuming an input document image 101 is in the RGB (Red, Blue, Green) color space, the RGB input data is converted to a luminance/chrominance space, such as a known YCrCb space. In one embodiment, the conversion can be done using a pre-calculated look-up-table to speed up the computation as is implemented in some image/video compression programs. In one embodiment, when the image data is input in luminance, color space conversion can be omitted.

In one embodiment, smoothing (e.g., low-pass filtering) is then performed which is useful in eliminating some noise effects. In one embodiment, performing smoothing is determined by the resolution at which document image 101 was acquired and the minimum size of the characters which can be processed. Therefore, it is appreciated that smoothing is not performed in some situations. In one embodiment, a Gaussian lowpass filter construct may be applied to provide a requisite level of smoothing.

In one embodiment, edges within the image are identified and classified as either NON EDGE, WHITE EDGE, or BLACK EDGE. In one embodiment, this comprises calculating a vertical gradient, a horizontal gradient, and the magnitude of gradient. A discreet Laplacian (a second directive is then calculated and each pixel is then classified as either NON EDGE, WHITE EDGE, or BLACK EDGE.

In one embodiment, horizontal line segments are classified by edge-bounded averaging. For example, for a horizontal line, an analysis proceeds from left to right to identify consecutive segments of NON EDGE pixels and EDGE (including both WHITE and BLACK) pixels. Each NON EDGE segment is potentially the interior of a text, or graphic character? In one embodiment, a NON EDGE segment, except at the left and right image border, is sandwiched by two edge segments.

In one embodiment, vertical consistency is also accounted for. For example, for a segment tentatively classified as BLACK INTERIOR (or WHITE INTERIOR), the number of pixels classified as WHITE INTERIOR (or BLACK INTERIOR) in the previous line is counted. IF the number is larger than a preset percentage, of the segment length, the segment may be disqualified as text, or a graphic character, and it is classified as NON TEXT.

In one embodiment, vertical segments classified as NON TEXT are examined to determine whether some of them can be reclassified using vertical filling criteria. In one embodiment, the length of a segment should be less than a given number which may depend upon the resolution of document image 101. Additionally, the immediate neighbor pixels of the two ends should be compatible types. For example, BLACK INTERIOR and BLACK EDGE, or WHITE INTERIOR and WHITE EDGE may be identified as compatible types of neighbor pixels. Within those qualified segments, segments whose length is 1 and both of two end neighbors are edges of the same type of either BLACK EDGE or WHITE EDGE are distinguished. For this type of segment, the segment is preferable reclassified the same type as its end neighbors. For other qualified segments, the segment can be reclassified as BLACK INTERIOR if its end neighbors are either BLACK INTERIOR or BLACK EDGE, and WHITE INTERIOR if its end neighbors are either WHITE INTERIOR or WHITE EDGE.

In one embodiment, vertical consistency analysis is performed upon pixels not yet classified as NON TEXT. In one embodiment, vertical consistency analysis identifies horizontal segments characterized by consecutive pixels not classified as edges (WHITE EDGE, BLACK EDGE, and a newly introduced DELETED EDGE) and having a length exceeding a length threshold. In one embodiment, each pixel within such a segment should be WHITE INTERIOR, BLACK INTERIOR, or NON TEXT. DELETED EDGE refers to a pixel that is an edge pixel, but does not qualify as a text pixel.

In one embodiment, pixel connectivity analysis is also performed to identify aggregates of pixels that have been identified as candidates for text and collects their statistics at the same time. In one embodiment, the aggregate is called a sub-blob. Two pixels belong to the same sub-blob if they are 8-neighbor connected, and they are labeled as the same category BLACK (EDGE or INTERIOR) or WHITE (EDGE or INTERIOR).

In one embodiment, sub-blobs are examined. For example, in one embodiment if the total number of pixels is less than a given threshold, the sub-blob is marked s NON TEXT.

In one embodiment, 8-neighbor sub-blobs not marked as NON TEXT are grouped into blobs. The connectivity of sub-blobs is the same as for pixels in one embodiment. In other words, two sub-blobs, whether they are white sub-blobs or black sub-blobs, are connected if they share at least one 8-jconnected pixel pair. Typically, there is not constraint on the number and topological arrangement of sub-blobs within one blob. The following statistics for each blob are collected in one embodiment: the number of outer border pixels and the number of inner sub-blobs. An outer border pixel is a pixel belonging to the blob and is neighbored to a NON TEXT pixel. In inner sub-blob is a sub-blob belonging to the blob and does not connect to any pixel that does not belong to the blob.

In one embodiment, text pixels are next identified. A complex document image may include dark characters on light background, light characters on dark background and/or characters on top of pictorial regions. Correspondingly, a blob may contain both black and white sub-blobs. In order to identify text pixels, a determination of which type (black or white) of sub-blob is text. One embodiment classifies all pixels within an image as text and non-text using a binary notation (e.g., where a bit 1 represents a text pixel and a bit 0 represents a non-text pixel). Alternatively, a bit 0 may be used to represent a text pixel and a bit 1 to represent a non-text pixel.

Thus, one embodiment provides text region extraction. Compound document images are images containing mixtures of text characters, line drawings, and continuous toned pictorial regions. Block 220 allows extraction of sharp edge components such as letters, numbers, line drawings, logos, symbols, etc. from document image 101. Additionally, block 220 facilitates detecting these components when they are overlying images or colored backgrounds. In contrast to Optical Character Recognition (OCR) systems, block 220 can detect and separate these components from document image 101 without the necessity of recognizing a letter, number, symbol, line drawing, logo, or other graphic representation.

Figure 3C:
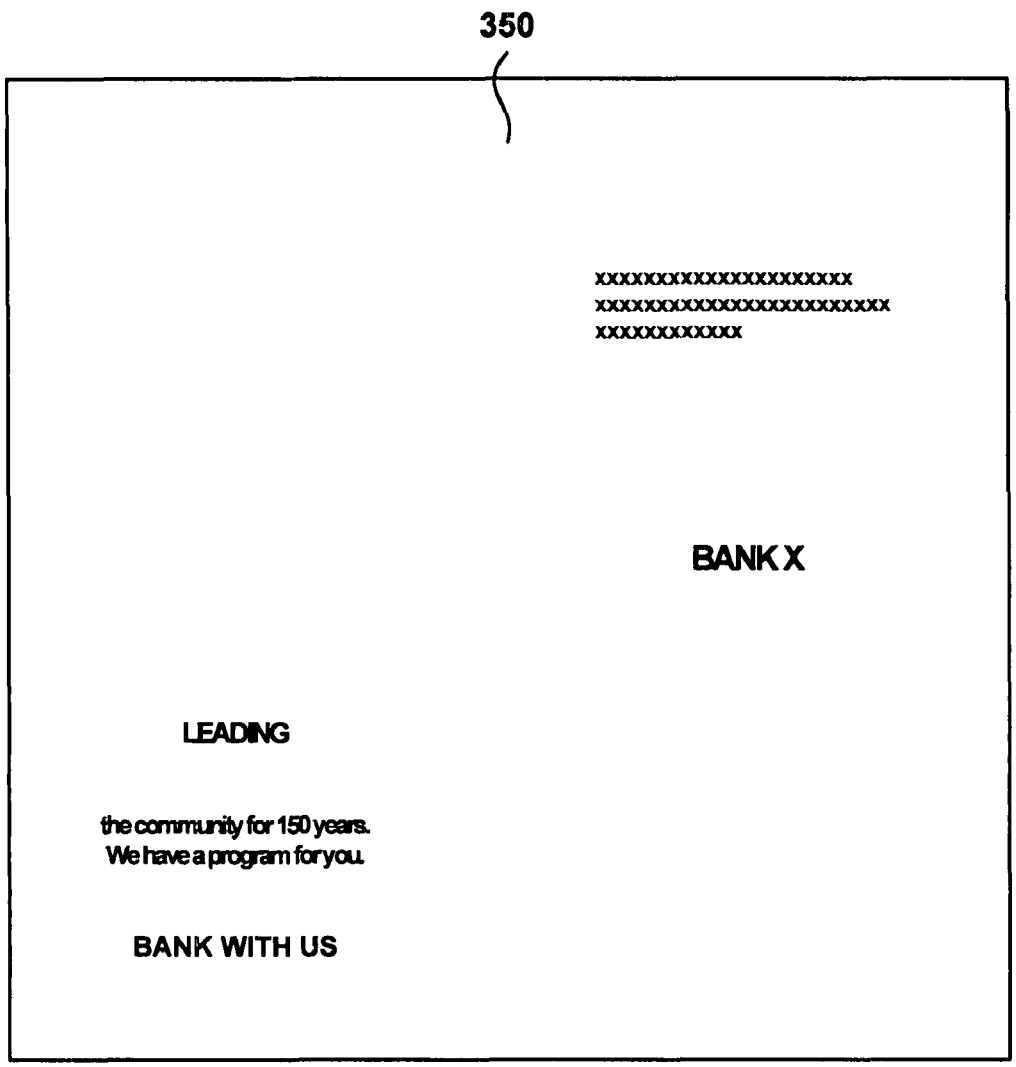

Referring now to FIG. 3C, it is shown that the text portions comprising document image 101 have been extracted and stored as a bitmap image 350 of the extracted sharp edge components. In one embodiment, bitmap image 350 comprises pixel information of the graphic representations such as numbers, letters, characters, etc. comprising document image 101. However, no recognition of the characters, numbers, letters, etc. comprising the text region is determined or stored in an embodiment of the present invention. By not requiring the recognition of characters during the sharp edge extraction process, embodiments of the present invention typically have a lower requirement of computational resources than a typical OCR program. It is further noted that this information is independent of region information describing a spatial relationship of an identified region (e.g., 301, 310, 320, 330, and 331 of FIG. 3B) in accordance with an embodiment of the present invention.

In block 230 of FIG. 2, text regions of the document are extracted as a separate image. In one embodiment, based upon the output of block 210 and block 220, text regions of document image 101 are extracted and analyzed separately in block 240 below. As described above, block 210 identifies the boundaries of regions which contain, but are not limited to, a text (or other graphic character) region, a color graphics region, a black and white region, a photograph region, etc. Block 220 extracts sharp-edge components which are likely to be characters, numbers, line drawings, logos, symbols, and the like. In block 230, the sharp edge components are combined with the identified region boundaries to facilitate separately identifying characteristics of regions as described below. By removing the sharp edge components in block 220, extraneous artifacts which may be in the background of an identified region are removed from the identified regions which are to be processed. This facilitates determining the characteristics of the sharp edge components as described below.

Figure 3D:
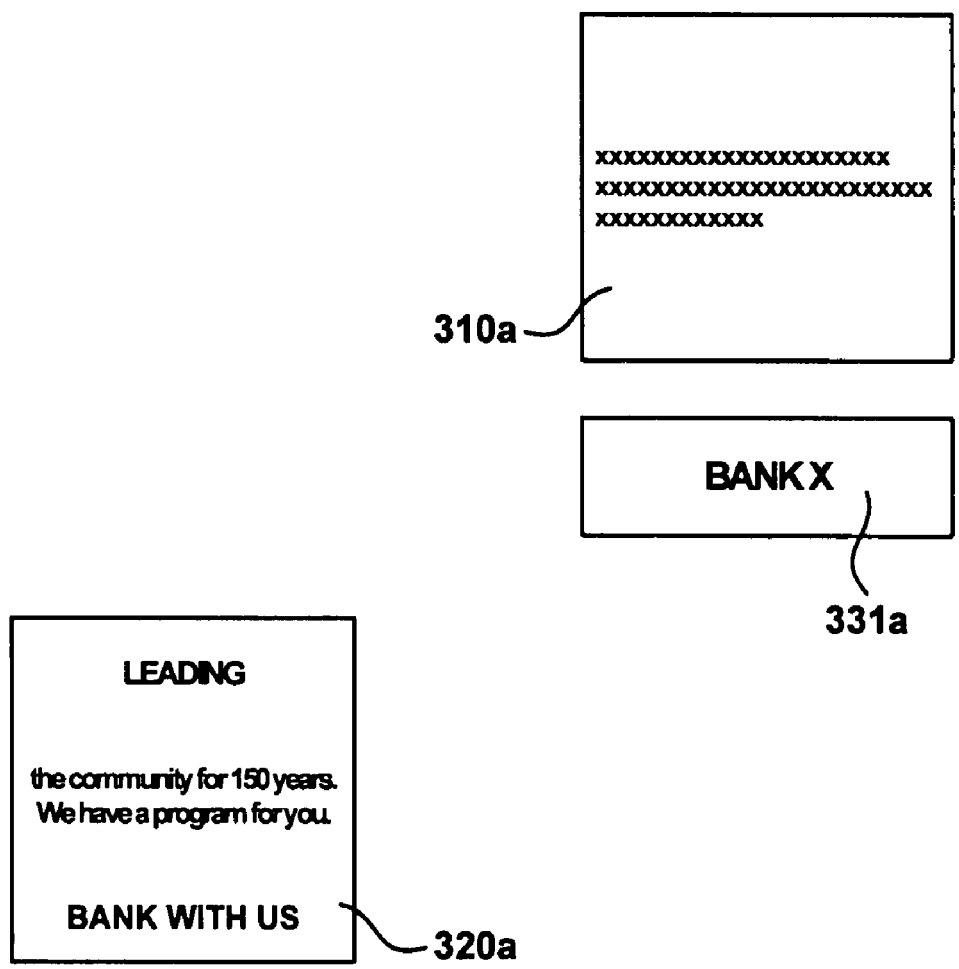

Referring now to FIG. 3D, it is shown that the region information that were identified in block 210 is combined with the extracted sharp edge components extracted in block 220 to create text regions 310a, 320a, and 331a.

In block 240 of FIG. 2, a font size and line spacing are estimated for each text region or zone. It is noted that while the following discussion references determining the characteristics of a line of text, embodiments of the present invention are not limited to determining the characteristics of text alone in block 240. In one embodiment, de-skewing is performed. In other words, if document image 101 was scanned at angle, the lines of text may be aligned to facilitate determining the characteristics of that line of text. In one embodiment, a plurality of skew lines (e.g., over a range of angles) are projected onto a portion of document image 101. In one embodiment, a measure of the pixel intensities along each of the skew lines is made and an analysis of these pixel intensities helps the angle of the line of text, with respect to the y-axis of document image 101, at which the line of text is skewed. Using this information, the line of text can be de-skewed for further analysis.

Figure 4:
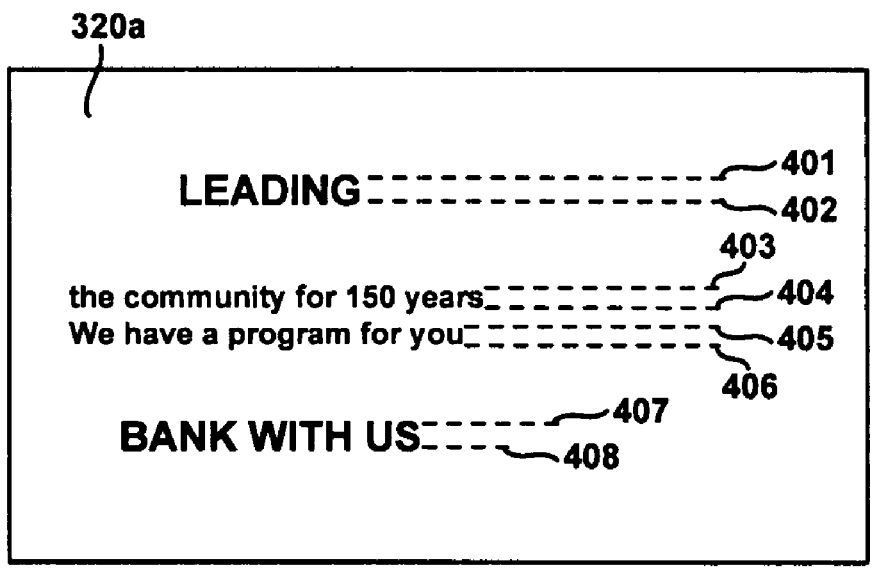
FIG. 4 shows exemplary text which is analyzed in accordance with an embodiment of the present invention.

In one embodiment, a derivative of the horizontal projection is then obtained. Assuming that the line of text is horizontal, a measure of the pixel intensities along each line of text is made which is plotted as a projection profile. In one embodiment, the maximal derivative values of the positive and negative slopes of the projection profile are plotted which are descriptive of the X-height lines and baseline respectively of a given line of text. With reference to FIG. 4, X-height refers to the average maximum height of all letters, characters, numbers, etc. comprising a line of text, or other graphical representations (e.g., 401, 403, 405, and 407 of FIG. 4). Baseline refers to calculated average or approximate position from which each of the letters, characters, numbers, etc. comprising a line of text is written (e.g., 402, 404, 406, and 408).

In one embodiment, the projection lines are sorted and projection lines having a maximal derivative value greater than a given threshold are obtained. In one embodiment, to detect the text line and X-height line, the local maximum peaks are selected and derivatives are sorted in descending order. The project lines that have a derivative larger than a pre-determined threshold (e.g., the average intensity of the image) are selected and analyzed.

In one embodiment, the projection lines are then filtered based on the distance between adjacent projection lines. For example, in one embodiment the selected projection lines are first filtered based on their distances with the adjacent lines and projection intensities (e.g., the distance between two adjacent lines such as between lines 401 and 402, between lines 403 and 404, between lines 405 and 406, or between lines 407 and 408) must be larger than 3 points (on 72 dpi resolution). If the distance between two adjacent lines is not larger than 3 points, the projection line having the higher intensity value is selected.

In one embodiment, the projection lines are filtered so that for each projection line, the average signal intensity between two adjacent lines are higher than average on one side and lower than average on the other side. This is performed in order to detect both base and X-height for a text line. The project lines should alternate as base lines and X-height lines. The average signal intensity between each pair of lines is measured. Typically, the average image intensity between a base line and an X-height (e.g., between X-height line 401 and baseline 402 of FIG. 4) of the same text line should be larger than the average image intensity of the whole image of a given text region (e.g., 320a). The image intensity between two text lines (e.g., from baseline 402 of the current text line to the X-height line 403 of the next text line) should be lower than the average image intensity of the whole image of text region 320a. In one embodiment, assuming the base line to X-height line of the same text line is dT, base line to the X-height line of the next text line is dL, and image resolution is R, font size and line spacing are calculated as:

Font size+2*R/72.27 dpi*dT;

Line spacing+2*R/72.27 dpi*dL

Figure 3E:
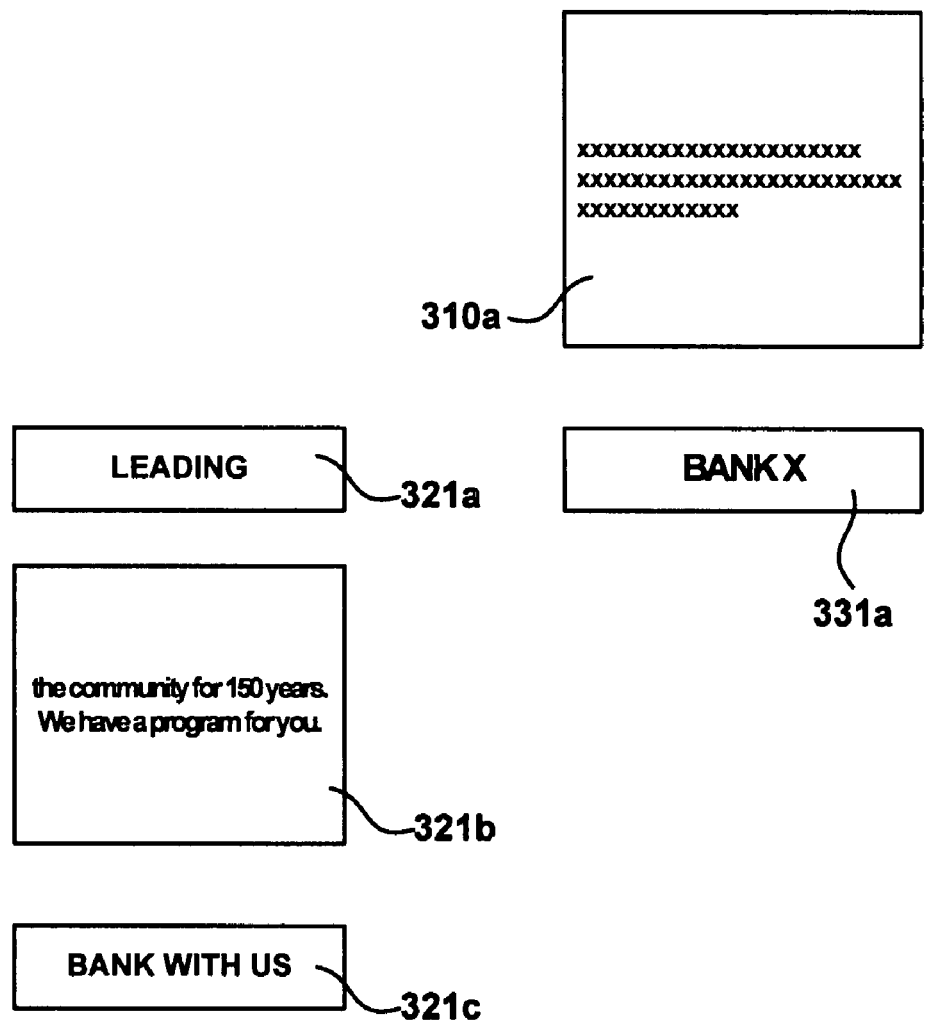

As shown in FIG. 3E, region 320a has been divided into 3 separate sub-zones based upon the font size of text comprising region 320a. Thus, in FIG. 3E, region 320a has been divided into regions 321a, 321b, and 321c. In one embodiment, the text size and line spacing of text regions 310a, 321a, 321b, 321c, and 331a have been determined and stored in block 240.

In block 250 of FIG. 2, a representative color for each region is determined. In one embodiment, the average overall color of a region (e.g., 301, 310, 320, and 330 of FIG. 1) is determined using a color histogram and stored. In another embodiment, the most predominant color of a region is determined using a color histogram. In one embodiment, the most common color other than background (e.g., white) is selected as the representative color for each of regions comprising a drawing.

In block 260 of FIG. 2, an editable template is created using the data from block 210, block 240, and block 250. In one embodiment, this is performed by first creating an Extensible Stylesheet Language Formatting Objects (XSL-FO) compatible template. In one embodiment, after the XSL-FO template has been created, it is converted into a document format which is editable by an application operable upon computer system 100 (e.g., editable template 130 of FIG. 3F). In one embodiment, the XSL-FO template comprises bounding boxes which describe the regions or zones identified in block 210. In one embodiment, the place holder for each of the image and/or drawing regions is describes as an SVG block with the bounding polygon outline of that region and filled with the representative color selected above as described in block 250. In one embodiment, the representative color for each region as determined in block 250 is then assigned to the corresponding region in editable template 130. For example, if the representative color of region 301 is determined to be green, the representative color of region 301a is also green. If the representative color of region 310 is determined to be blue, the representative color of region 310a is also blue, etc. Similarly, the representative color of sub-regions 321a, 321b, and 321c are the same as the representative color for region 320.

Figure 3F:
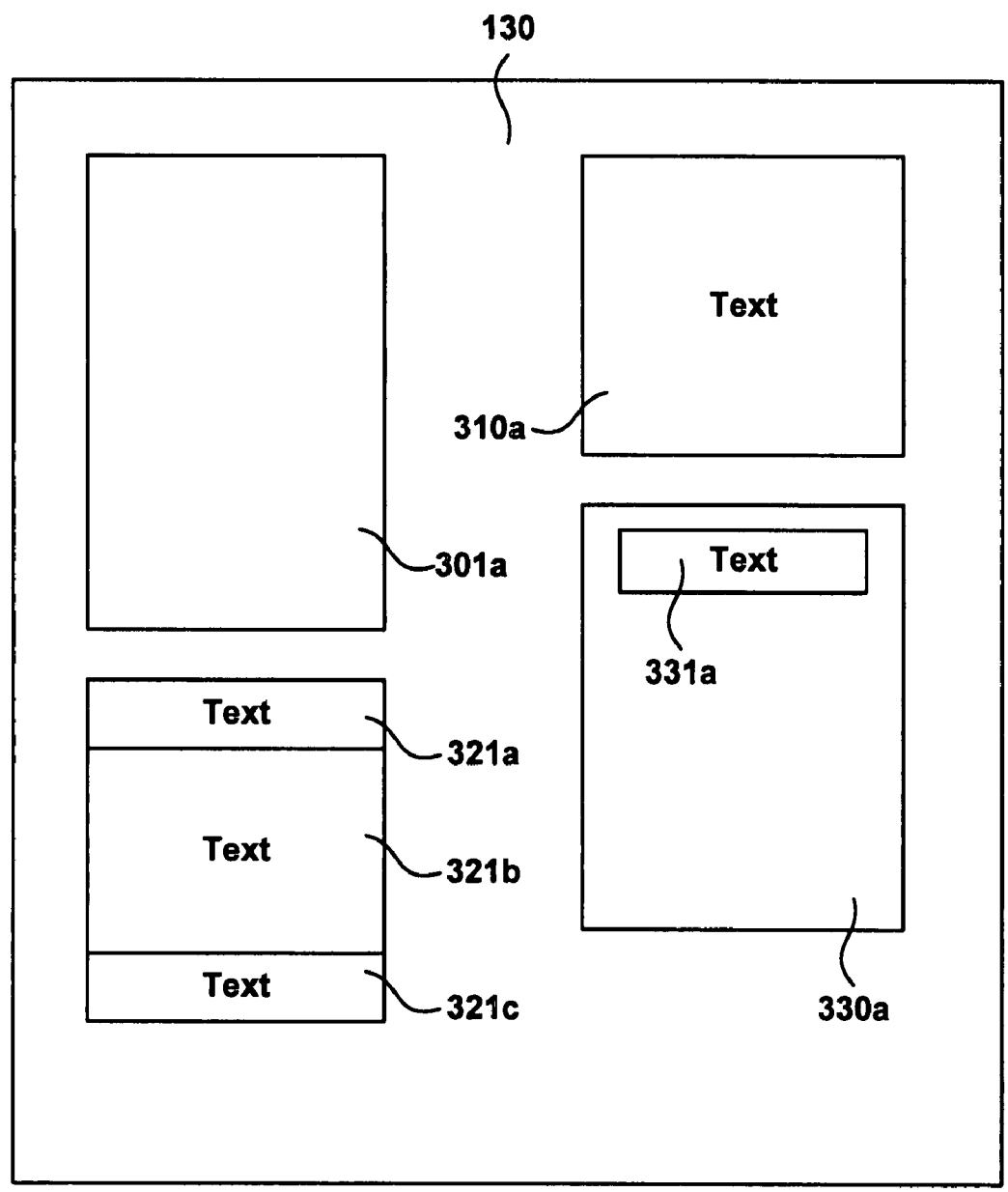

In one embodiment, place holder for each text region has the estimated font size and line spacing as determined in block 240 above. Text content within that region is filled with "Text . . . " in one embodiment as a place holder of the characteristics of that particular region. Referring to FIG. 3F, the text place holder for region 310a has the same characteristics as the text in region 310 of document image 310. Similarly, the text place holder for region 331a has the same characteristics as the text in region 331 of document image 101. In the embodiment of FIG. 3F, the text place holder for region 321a has the same characteristics as one portion of the text from region 320, the text place holder for region 321b has the same characteristics as the text from a second part of region 320, and the text place holder for region 321c has the same characteristics as a third part of region 320. In one embodiment, a default system font is chosen as the font type for document image 101. It is appreciated that the default system font is either a pre-determined, or user selected, font type in embodiments of the present invention.

The overall look and feel of document image 101 is retained in editable template 130 in accordance with an embodiment of the present invention. However, the content of document image 101 is not retained in editable template 130. Thus, a user can use editable template 130 to create a new document which has the same aesthetic qualities as document image 101, but containing different content.

Figure 5:
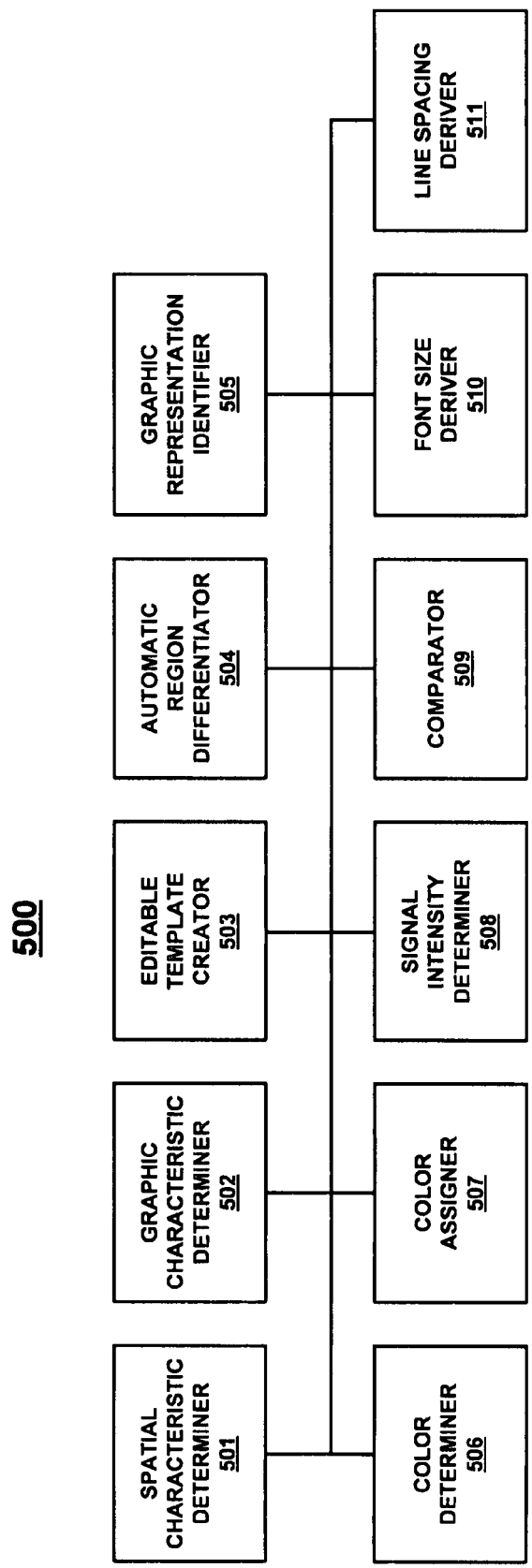
FIG. 5 is a block diagram of a system for creating an editable template from a document in accordance with an embodiment of the present invention.

FIG. 5 is a block diagram of a system 500 for creating an editable template from a document in accordance with an embodiment of the present invention. It is noted that the functionality of separate components shown in FIG. 5 may be combined in embodiments of the present invention. In one embodiment, system 500 comprises a spatial characteristic determiner 501 for determining the spatial characteristics of at least one region (e.g., 310) of a first document (e.g., 101). As described above, embodiments of the present invention are operable for identifying separate regions such as text, images, pictures, line drawings, etc. and determining the spatial characteristics (e.g., boundary size, orientation, and spatial relationship to the overall document) of each region.

In one embodiment, system 500 further comprises a graphic characteristics determiner 502 for determining a set of characteristics of a first graphic representation within at least one identified region. Furthermore, this can be performed without the necessity of recognizing a character comprising the graphic representation. As described above, embodiments of the present invention are operable for determining graphic characteristics such as font size and line spacing of a text region of a document.

In one embodiment, system 500 further comprises an editable template creator 503. As described above, embodiments of the present invention are operable for creating an editable template (e.g., 130) comprising a second region (e.g., 310a) having the same spatial characteristics of said at least one region (e.g., 310) and comprising a second graphic representation which is defined by said set of characteristics of said first graphic representation. In other words, the text, or other graphic representation, will have the same font size and line spacing as the text in the identified region of document image 101.

In one embodiment, system 500 further comprises an automatic region differentiator 504. As described above with reference to block 210 of FIG. 2, embodiments of the present invention are operable for differentiating regions of document image 101 automatically, or by using operator input. In one embodiment, automatic differentiation of a region is based upon the contrast of that region. In other words, text and other graphic representations typically have sharper, or more defined, edges than photographs or images in which colors tend to fade gradually from one color to the next.

In one embodiment, system 500 further comprises a graphic representation identifier 505 for identifying at least one graphic representation based upon the contrast of the graphic representation and for determining that a region comprising a graphic representation overlies an image region. With reference to FIG. 3B, it is noted that one embodiment identified region 331 as a separate graphic region which overlies an image region 330.

In one embodiment, system 500 further comprises a color determiner 506. In embodiments of the present invention, color determiner 506 is for determining a representative color of a region (e.g., 310 of document image 101). It is noted that color determiner 506 determines a representative color for each region identified from document image 101 in embodiments of the present invention.

In one embodiment, system 500 further comprises a color assigner 507. In embodiments of the present invention, color assigner 507 assigns the representative color determined by color determiner 506 to a corresponding region of editable template 130. For example, the representative color of region 310 is assigned to region 310a of editable template 130 by color assigner 507. It is noted that each representative color of an identified region of document image 101 is assigned to a corresponding region of editable template 130 in embodiments of the present invention. Thus, a representative color of an image region (e.g., 301 of FIG. 3A) is assigned to corresponding region 301a of editable template 130.

In one embodiment, system 500 further comprises a signal intensity determiner 508. In embodiments of the present invention, signal intensity determiner 508 is used as described above with reference to block 240 in determining a font size and line spacing of font within an identified text region. In one embodiment, signal intensity determiner 508 determines the signal intensity of a text region (e.g., an average signal intensity of text region 310a) as a whole. Signal intensity determiner 508 then determines the signal intensity of each line of text, or other graphic representation (e.g., between lines 401 and 402 of FIG. 4). Signal intensity determiner 508 also determines the signal intensity of regions between each line of text (e.g., between lines 402 and 403 of FIG. 4).

In one embodiment, system 500 further comprises a comparator 509 for comparing the average signal intensity of text region 310a with a signal intensity of a line of text and for comparing the average signal intensity of text region 310a with the signal intensity of an area between two lines of text.

In embodiments of the present invention, system 500 further comprises a font size deriver 510 for deriving the font size of a line of text as described above with reference to block 240 of FIG. 2.

In embodiments of the present invention, system 500 further comprises a line spacing deriver 511 for deriving a line spacing of text, or other graphic representations, comprising a text region as described above with reference to block 240 of FIG. 2.

Figure 6:
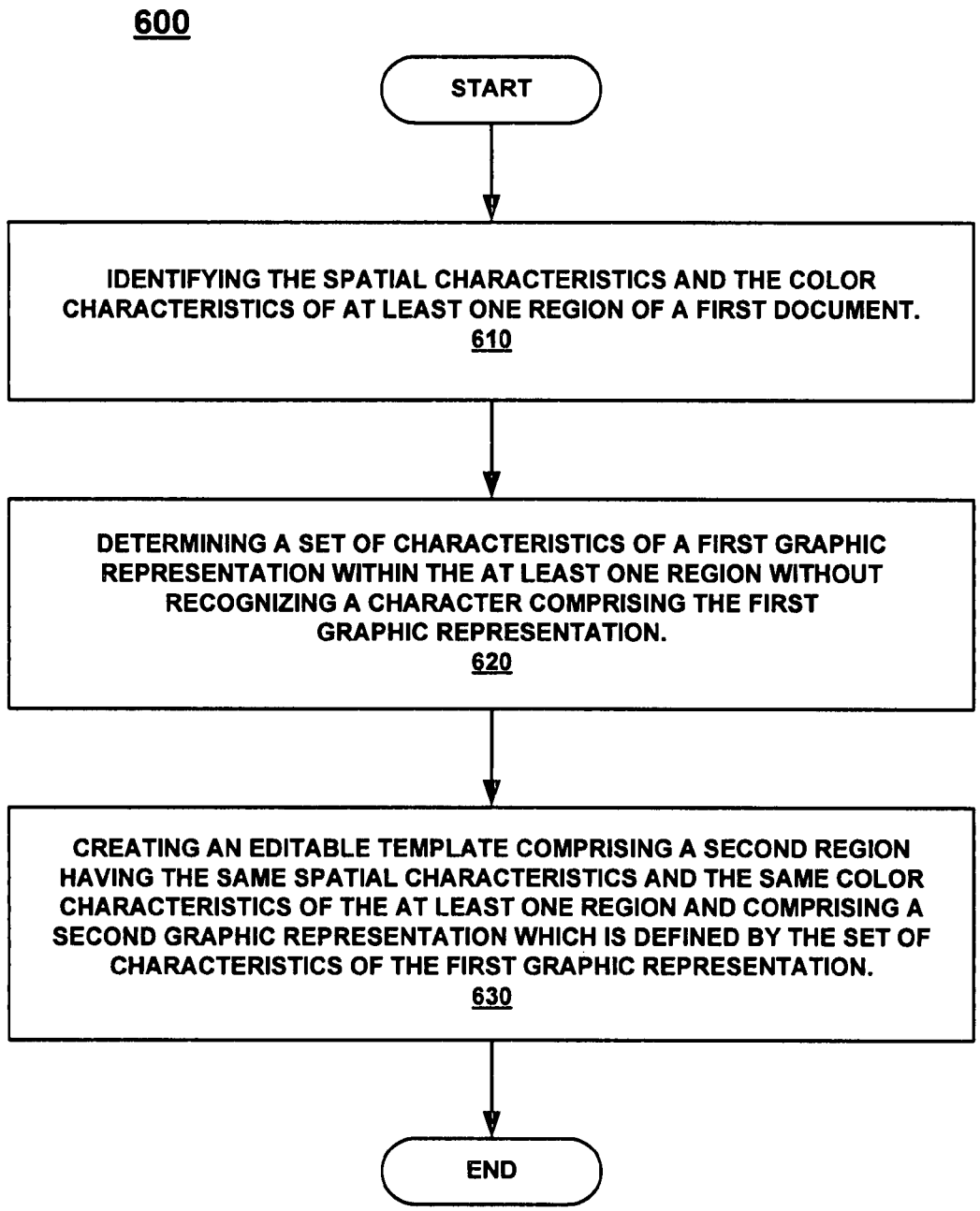
FIG. 6 is a flowchart of a method for creating an editable template from a document image in accordance with an embodiment of the present invention.

FIG. 6 is a flowchart of a method 600 for creating an editable template from a document image in accordance with an embodiment of the present invention. In block 610 of FIG. 6, the spatial characteristics and the color characteristics of at least one region of a first document are identified. As described above with reference to FIG. 2, the different regions (e.g., 301, 310, 320, and 330 of FIG. 3A) are identified and stored. In one embodiment, this comprises determining the boundaries of each region separately in relation to document image 101 and storing a description of the boundary edges of each region. Furthermore, in one embodiment a representative color of the different regions (e.g., 301, 310, 320, and 330 of FIG. 3A) is determined.

In block 620 of FIG. 6, a set of characteristics of a first graphic representation within the at least one region are determined without recognizing a character comprising the first graphic representation. As described above with reference to FIG. 2, a set of characteristics of a first graphic representation are determined without the necessity of recognizing a character comprising the graphic representation. In embodiments of the present invention, sharp edge components of document image 130 can be extracted without recognizing a character as described above with reference to block 220. In embodiments of the present invention, the character representation can comprise a letter, number, symbol, line drawing, logo, etc.

In block 630 of FIG. 6, an editable template is created comprising a second region having the same spatial characteristics and the same color characteristics of the at least one region and comprising a second graphic representation which is defined by the set of characteristics of the first graphic representation. As described above with reference to FIG. 2, an editable template 130 is created comprising a second region (e.g., 310*a* of FIG. 3F) having the same spatial characteristics of at least one region (e.g., 310 of FIG. 3A) of document image 101. Additionally, a representative color of the second region (e.g., 310*a* of FIG. 3F) has the same representative color as the at least one region (e.g., 310 of FIG. 3A). Furthermore, the graphic representation (e.g., text) of text region 310*a* has the same characteristics (e.g., font size and line spacing) as the text of region 310 of document image 101.

Figure 7:
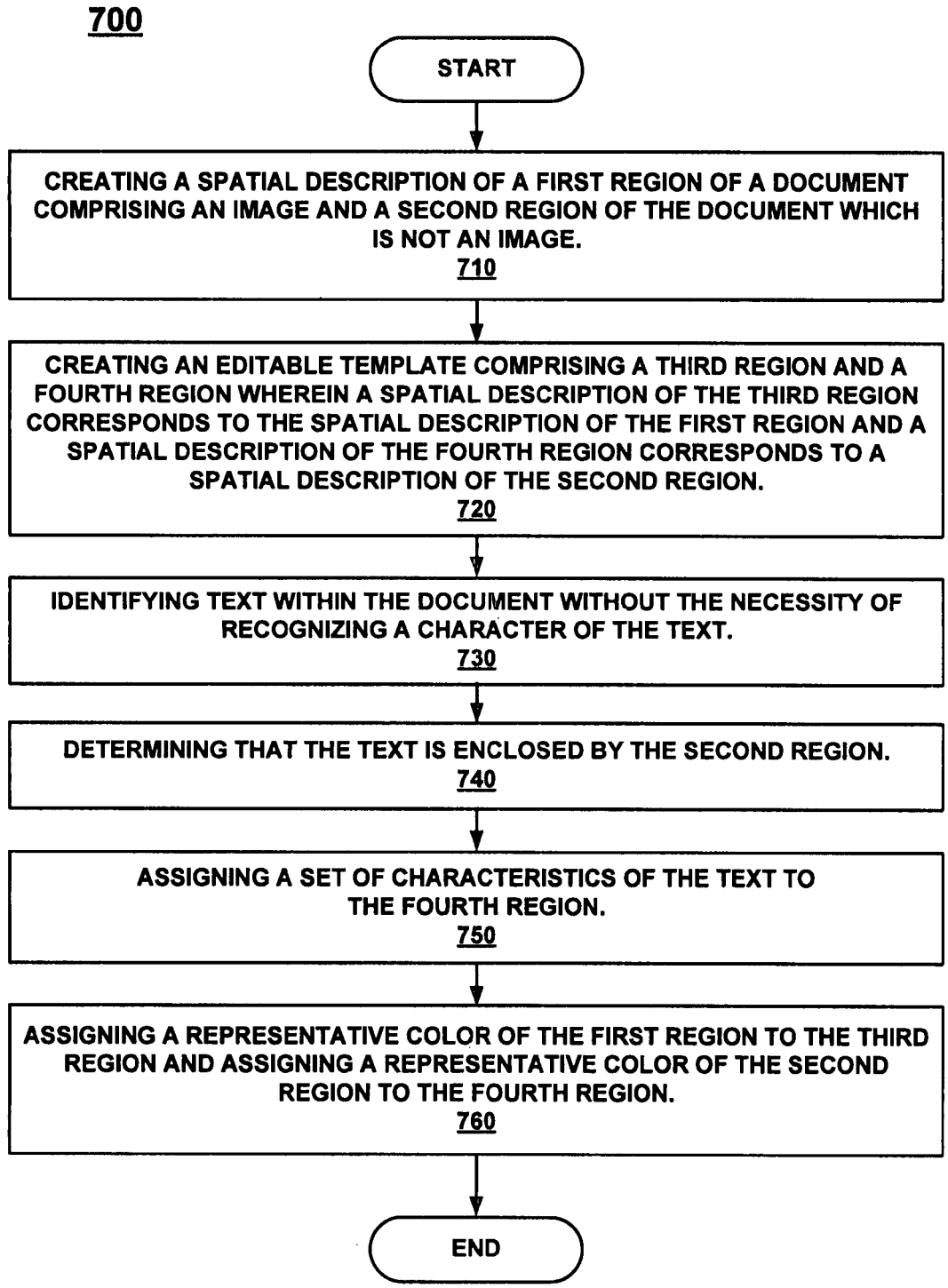
FIG. 7 is a flowchart of a method creating an editable template from a document image in accordance with an embodiment of the present invention.

FIG. 7 is a flowchart of a method 700 for creating an editable template from a document image in accordance with an embodiment of the present invention. It is noted that method 700 is not intended to describe a sequencing of events for creating an editable template in accordance with embodiments of the present invention. In block 710 of FIG. 7, a spatial description of a first region of a document (e.g., 101 of FIG. 3A) comprising an image (e.g., 301) and a second region which is not an image (e.g., 310) is created. With reference to FIG. 3B, a spatial description of the boundaries of each identified region of document image 101 is created and stored.

In block 720 of FIG. 7, an editable template is created comprising a third region and a fourth region wherein a spatial description of the third region corresponds to the spatial description of the first region and a spatial description of the fourth region corresponds to a spatial description of the second region. As described above with reference to block 260 of FIG. 2, an editable template (e.g., 130) is created having a third region (e.g., 301*a*) and a fourth region (e.g., 310*a*). In one embodiment, the spatial description of region 301*a* corresponds to the spatial description of region 301. In other words, the relationship of the boundaries of region 301*a* relative to editable template 130 corresponds with the relationship of the boundaries of region 301 relative to document image 101. Similarly, the relationship of the boundaries of region 310*a* relative to editable template 130 corresponds with the relationship of the boundaries of region 310 relative to document image 101.

In block 730 of FIG. 7, text within the document is identified without the necessity of recognizing a character of the text. As described above with reference to block 220, text is extracted from document image 101 and stored as a bitmap image (e.g., 350) without the necessity of recognizing a character of the extracted text.

In block 740 of FIG. 7, it is determined that the text is enclosed by the second region. As described above with reference to block 230 of FIG. 2, the region boundary information is combined with the extracted text to create text regions (e.g., 310*a*) which are later used in creating editable template 130.

In block 70 of FIG. 7, a set of characteristics of the text is assigned to the fourth region. As described above with reference to block 240 of FIG. 2, characteristics of text, or other graphic representations, within a given text region are identified. In one embodiment, this comprises determining the font size and line spacing of the text within a given text region. In embodiments of the present invention, those text characteristics are assigned to the fourth region (e.g., 310*a*) such that when new text is written into text region 310*a*, it will have the same font size and line spacing as the original text in region 310 of document image 101.

In block 760 of FIG. 7, a representative color of the first region is assigned to the third region and a representative color of the second region is assigned to the fourth region. As described above with reference to block 250 of FIG. 2, a representative color for each identified region of document image 101 is determined. For example, a representative color for region 301 of document image 101 is assigned to region 301*a* of editable template 130. Similarly, a representative color for region 310 of document image 101 is assigned to region 310*a* of editable template 130.

Figure 8:
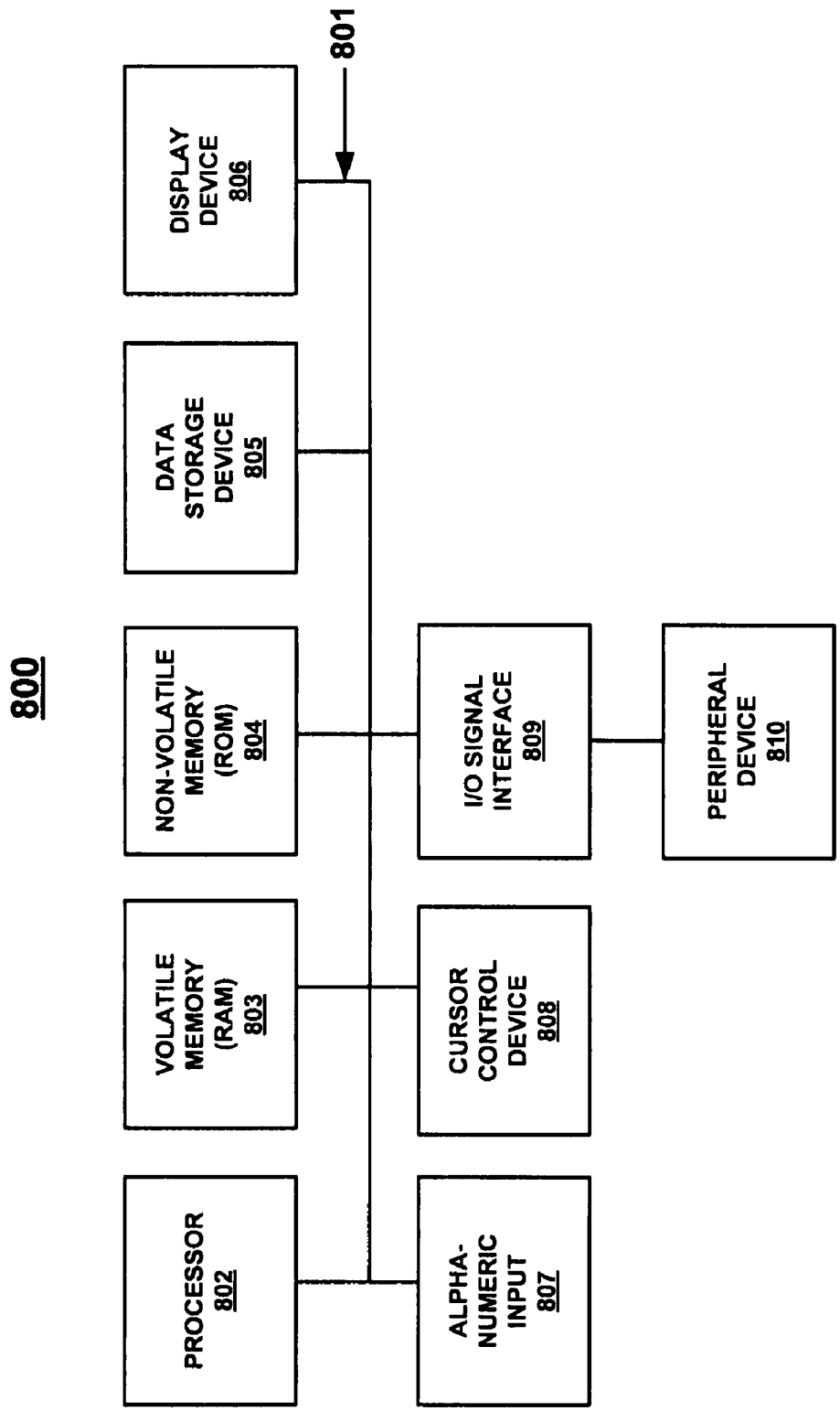
FIG. 8 is a block diagram of an exemplary computer system upon which embodiments of the present invention may be implemented.

With reference to FIG. 8, portions of the present invention are comprised of computer-readable and computer-executable instructions that reside, for example, in computer system 800 which is used as a part of a general purpose computer network (not shown). It is appreciated that computer system 800 of FIG. 8 is exemplary only and that the present invention can operate within a number of different computer systems including general-purpose computer systems, embedded computer systems, laptop computer systems, hand-held computer systems, and stand-alone computer systems.

In the present embodiment, computer system 800 includes an address/data bus 801 for conveying digital information between the various components, a central processor unit (CPU) 802 for processing the digital information and instructions, a volatile main memory 803 comprised of volatile random access memory (RAM) for storing the digital information and instructions, and a non-volatile read only memory (ROM) 804 for storing information and instructions of a more permanent nature. In addition, computer system 800 may also include a data storage device 805 (e.g., a magnetic, optical, floppy, or tape drive or the like) for storing vast amounts of data. It should be noted that the software program for creating an editable template from a document image of the present invention can be stored either in volatile memory 803, data storage device 805, or in an external storage device (not shown).

Devices which are optionally coupled to computer system 800 include a display device 806 for displaying information to a computer user, an alpha-numeric input device 807 (e.g., a keyboard), and a cursor control device 808 (e.g., mouse, trackball, light pen, etc.) for inputting data, selections, updates, etc. Computer system 800 can also include a mechanism for emitting an audible signal (not shown).

Returning still to FIG. 8, optional display device 806 of FIG. 8 may be a liquid crystal device, cathode ray tube, or other display device suitable for creating graphic images and alpha-numeric characters recognizable to a user. Optional cursor control device 808 allows the computer user to dynamically signal the two dimensional movement of a visible symbol (cursor) on a display screen of display device 806. Many implementations of cursor control device 808 are known in the art including a trackball, mouse, touch pad, joystick, or special keys on alpha-numeric input 807 capable of signaling movement of a given direction or manner displacement. Alternatively, it will be appreciated that a cursor can be directed and/or activated via input from alpha-numeric input 807 using special keys and key sequence commands. Alternatively, the cursor may be directed and/or activated via input from a number of specially adapted cursor directing devices.

Furthermore, computer system 800 can include an input/output (I/O) signal unit (e.g., interface) 809 for interfacing with a peripheral device 810 (e.g., a computer network, modem, mass storage device, etc.). Accordingly, computer system 800 may be coupled in a network, such as a client/server environment, whereby a number of clients (e.g., personal computers, workstations, portable computers, minicomputers, terminals, etc.) are used to run processes for performing desired tasks. In particular, computer system 800 can be coupled in a system for creating an editable template from a document.

The preferred embodiment of the present invention, a system and method for creating an editable template from a document, is thus described. While the present invention has been described in particular embodiments, it should be appreciated that the present invention should not be construed as limited by such embodiments, but rather construed according to the following claims.

What is claimed is:

1. A method for creating an editable template from a document image, said method comprising:
   using a computer system to perform:
   identifying spatial characteristics and color characteristics of at least one region of a first document;
   determining a set of characteristics of a first graphic representation within said at least one region and wherein said determining is performed without recognizing a character comprising said first graphic representation; and
   creating an editable template comprising a second region having same spatial characteristics and same color characteristics of said at least one region and comprising a second graphic representation which is defined by said set of characteristics of said first graphic representation.

2. The method as recited in claim 1 further comprising:
   identifying spatial characteristics and color characteristics of an image region of said first document which is separate from said at least one region of said first document; and
   creating a third region in said editable template having same spatial characteristics and same color characteristics as said image region of said first document.

3. The method as recited in claim 2 further comprising:
   automatically differentiating said at least one region from said image region based upon contrast of said at least one region and said image region.

4. The method as recited in claim 2 further comprising:
   determining that said at least one region overlies said image region.

5. The method as recited in claim 2 wherein said identifying said color characteristics further comprises:
   determining a representative color for said at least one region;
   assigning said representative color to said second region;
   determining a second representative color for said image region; and
   assigning said second representative color to said image region to said third region.

6. The method as recited in claim 1 wherein said determining said set of characteristics of said instance of text further comprises:
   identifying said first graphic representation based upon the contrast of said first graphic representation.

7. The method as recited in claim 6 further comprising:
   determining an average signal intensity of said at least one region;
   comparing a signal intensity of a first region comprising said first graphic representation with said average intensity to derive a font size of said first graphic representation; and
   comparing a second signal intensity of a second region not comprising said first graphic representation to derive a line spacing between said first graphic representation and another object.

8. A system for creating an editable template from a document, said system comprising:
   a spatial characteristic identifier for identifying spatial characteristics of at least one region of a first document;
   a graphic characteristic determiner for determining a set of characteristics of a first graphic representation within said at least one region and wherein said determining is performed without recognizing a character comprising said first graphic representation; and
   an editable template creator for creating an editable template comprising a second region having same spatial characteristics of said at least one region and comprising a second graphic representation which is defined by said set of characteristics of said first graphic representation.

9. The system of claim 8 wherein said spatial characteristic identifier is further for identifying the spatial characteristics of an image region of said first document which is separate from said at least one region of said first document and wherein said editable template creator creates a third region in said editable template having the same spatial characteristics as said image region of said first document.

10. The system of claim 9 further comprising:
   an automatic region differentiator for automatically differentiating said at least one region from said image region based upon contrast of said at least one region and said image region.

11. The system of claim 9 further comprising:
   a graphic representation identifier for identifying said first one graphic representation based upon contrast of said first graphic representation and for determining that said at least one region overlies said image region.

12. The system of claim 9 further comprising:
   a color determiner for determining a representative color for said at least one region and for determining a representative color for said image region; and
   a color assigner for assigning said representative color to said second region and for assigning said representative color for said image region to said third region.

13. The system of claim 8 further comprising:
   a signal intensity determiner for determining an average signal intensity of said at least one region, a first signal intensity of said first graphic representation, and a second signal intensity which does not comprise said first graphic representation;
   a comparator for comparing said average signal intensity with said first signal intensity and for comparing said average signal intensity with said second signal intensity;
   a font size deriver for deriving a font size of said first graphic representation based upon comparing said average signal intensity with said signal intensity of said first region; and
   a line spacing deriver for deriving a line spacing between said first graphic representation and another object based upon comparing said average signal intensity with said signal intensity of said second region.

14. A method for creating an editable template from a document image, said method comprising:
using a computer system to perform:
creating a spatial description of a first region of a document comprising an image and of a spatial description of a second region of said document which is not an image;
creating an editable template comprising a third region and a fourth region wherein a spatial description of said third region corresponds to said spatial description of said first region and a spatial description of said fourth region corresponds to said spatial description of said second region
identifying text within said document without necessity of recognizing a character of said text;
determining that said text is enclosed by said second region;
assigning a set of characteristics of said text to said fourth region; and
assigning a representative color of said first region to said third region and assigning a representative color of said second region to said fourth region.

15. The method as recited in claim 14 wherein said identifying text within said document further comprises:
identifying text within said document based upon contrast of said text.

16. The method as recited in claim 14 further comprising:
identifying a graphic representation within said document based upon contrast of said graphic representation.

17. The method as recited in claim 14 wherein said assigning a set of characteristics of said text further comprises:
determining an average signal intensity of said second region;
comparing a signal intensity of a first region of said text with said average intensity to derive a font size of said text; and
comparing a second signal intensity of a region between said first region of said text and a second region of said text to derive a line spacing between said first region of said text and said second region of said text.

18. The method as recited in claim 14 further comprising:
automatically differentiating said first region based upon contrast of said first region.

19. The method as recited in claim 18 further comprising:
determining that said second region overlies said first region.

20. The method as recited in claim 14 further comprising:
automatically determining said representative color of said first region; and
automatically determining said representative color of said second region.

\* \* \* \* \*